(12) United States Patent
Seibert

(10) Patent No.: US 7,003,101 B2
(45) Date of Patent: Feb. 21, 2006

(54) SUBBAND ECHO LOCATION AND DOUBLE-TALK DETECTION IN COMMUNICATION SYSTEMS

(75) Inventor: Michael Seibert, Ottawa (CA)

(73) Assignee: Zarlink Semiconductor Inc., Kanata (CA)

( * ) Notice: Subject to any disclaimer, the term of this patent is extended or adjusted under 35 U.S.C. 154(b) by 0 days.

(21) Appl. No.: 10/226,048

(22) Filed: Aug. 23, 2002

(65) Prior Publication Data

US 2004/0037417 A1  Feb. 26, 2004

(30) Foreign Application Priority Data

Aug. 29, 2001 (GB) ................................. 0120868

(51) Int. Cl.
*H04M 9/08* (2006.01)

(52) U.S. Cl. ................ 379/406.14; 379/406.01; 379/406.02; 379/406.04; 379/406.06; 379/406.08; 379/406.09; 379/406.12

(58) Field of Classification Search .................. 379/406.01–406.16
See application file for complete search history.

(56) References Cited

U.S. PATENT DOCUMENTS

| | | | | |
|---|---|---|---|---|
| 5,343,522 A | * | 8/1994 | Yatrou et al. ........... | 379/406.01 |
| 5,631,900 A | * | 5/1997 | McCaslin et al. ....... | 379/406.01 |
| 5,721,772 A | * | 2/1998 | Haneda et al. ......... | 379/406.14 |
| 5,737,410 A | | 4/1998 | Vahatalo et al. ........ | 379/410 |
| 6,192,126 B1 | * | 2/2001 | Koski .................... | 379/404.14 |
| 6,246,760 B1 | * | 6/2001 | Makino et al. ......... | 379/406.14 |
| 6,442,275 B1 | * | 8/2002 | Diethorn ................ | 379/406.14 |
| 6,522,747 B1 | * | 2/2003 | Reilly et al. ........... | 379/406.14 |
| 6,771,772 B1 | * | 8/2004 | Tanrikulu .............. | 379/406.14 |
| 2003/0235244 A1 | * | 12/2003 | Pessoa et al. | |

FOREIGN PATENT DOCUMENTS

| | | | | |
|---|---|---|---|---|
| EP | 0 769 867 | | 4/1997 | |
| EP | 0 798 877 | | 10/1997 | |
| GB | 2 135 558 | | 8/1984 | |
| GB | 2 344 036 | | 5/2000 | |
| GB | 2344036 A | * | 5/2000 | ............ 379/406.01 |
| GB | 2 348 092 A | | 9/2000 | |
| GB | 2 354 414 | | 3/2001 | |
| GB | 2354414 A | * | 3/2001 | |
| KR | 000051747 A | | 8/2000 | |
| WO | WO 01/05053 | | 1/2001 | |

* cited by examiner

Primary Examiner—Sinh Tran
Assistant Examiner—Ramnandan Singh
(74) Attorney, Agent, or Firm—Marks & Clerk; Richard J. Mitchell

(57) ABSTRACT

A method of controlling an echo canceller in a communications channel, is disclosed wherein input signals from the communications channel are first subbanded into a subband. Echo locations are then identified within the subband and are used to control the echo canceller. Typically, the echo canceller will be a fullband echo canceller with an adaptive filter, in which case the echo locations are used to control the filter coefficients.

11 Claims, 4 Drawing Sheets

SUBBAND ECHO LOCATION AND DOUBLE-TALK DETECTION IN COMMUNICATION SYSTEMS

BACKGROUND OF THE INVENTION

1. Field of Invention

This invention relates to the field of communications, and in particular to a method of locating echoes and detecting double-talk in communication systems. The method of the invention can be used to detect and track up to three distinct echoes in a communication channel, and provide automatic detection of doubletalk without any extra computations. These are important functions for use in echo cancellation systems.

2. Description of Related Art

Echoes are a serious problem in telephone channels. When a person speaks into a telephone, a voice signal travels to the receiver, where a portion of the signal returns to the originating telephone as an echo. This can be particularly annoying for the particiants, especially if the delay becomes appreciable.

Echo cancellation has been used extensively in telecommunications applications to recondition a wide variety of signals, such as speech, data transmission, and video. The search for mathematical algorithms to perform echo cancellation has produced several different approaches with varying degrees of complexity, cost, and performance.

The traditional approach to echo cancellation has been to use an adaptive filter of length L, where L equals the number of taps necessary to extend just beyond the duration of the echo. See, for example, S. Haykin, Adaptive Filter Theory, Prentice-Hall, Upper Saddle River, N.J. (1996). In the past, the ability to handle echoes up to 64 ms has been the standard, although 128 ms is becoming more the norm. At the conventional telephone bit rate of 8000 samples per second, 64 ms echo tail capacity requires L=512, and 128 ms capacity requires L=1024.

The desire to create ultra-high density echo cancellation parts, capable of cancelling hundreds or even thousands of channels of echo, presents a tremendous design challenge. As an example, using the popular LMS (Least Mean Squares) algorithm to cancel 128 ms echo tails in the 672 channels of a T3 line would require at least 11 billion multiply-accumulates (MACs) per second. This is well beyond what can be implemented practically and economically on a single chip.

To compensate, very low computation echo locators may be employed to assist the LMS filters. The echo locators tell the LMS filters when to run and which taps to update. The LMS filters only need to run when a channel's echo path changes. In a telephone system, for example, this usually only occurs at the start of a call. In the T3 example, it is extremely unlikely that all of the channels would need converging at the same time. It is therefore not necessary to have 672 LMS filters. Rather, each channel has a low computation echo locator, and these allocate a much smaller pool of LMS filters to converge channels as needed.

Low computation echo locators often make use of subbanding. See, for example, M. Vetterli and J. Kovacevic, Wavelets and Subband Coding, Prentice-Hall, Upper Saddle River, N.J. (1995). Subbanding involves using bandpass filters to isolate a range of frequencies. This process is then followed by downsampling, which is a reduction in the sampling rate of the signal. It is possible to run LMS on subbanded signals to track echoes with very few computations.

Double-talk is an additional problem which all echo cancellers face. The doubletalk condition arises when there is simultaneous transmission of signals from both sides of the echo canceller. Under such circumstances, the return echo path signal, $S_{IN}$ (see FIG. 1), contains both return echo from the echo source signal, and a double-talk signal. Double-talk prevents an LMS-based echo canceller from converging on the correct echo path. It will also cause a pre-converged echo canceller to diverge to unpredictable states. Following divergence, the echo canceller will no longer cancel the echo, and must reconverge to the correct solution. Such behaviour is highly unacceptable, and is to be avoided in actual devices. There is therefore a need for some means of detecting double-talk and preventing divergence.

An echo locator which estimates the bulk delay and span of a single echo reflection using fullband and subband methods has already been described in PCT publication No. WO0105053, entitled "Fast Line Echo Cancellation". This patent proposes to use a bulk delay estimator followed by an echo span detector to cancel the echo using a fullband adaptive filter operating in an "enhanced mode". The echo reflection is found using a plurality of subband filters. Only one echo reflection can be found and cancelled. No provisions are made for multiple reflections in the echo path, and no method for preventing divergence from double-talk is given.

SUMMARY OF THE INVENTION

The method in accordance with the invention is capable of detecting double-talk and automatically tracking path changes, which are important features of any robust echo canceller.

According to the present invention there is provided a method of controlling an echo canceller in a communications channel, comprising subbanding input signals from the communications channel into a subband; operating on the subbanded signals to determine echo locations within the subband; and using the echo locations of the subbanded signals to control the echo canceller.

The present invention differs from the prior art in a few ways. The purpose of the present invention is to provide information on echo locations, double-talk and path changes to an echo canceller. The emphasis here is not on cancelling echo, as such techniques are already well-known, but on controlling such an echo canceller. Once the location of the echo reflections are known, prior art methods of echo cancellation may be modified to exploit this information. They can then cancel the echo more efficiently than would be possible if this information were not known. Additionally, this information is provided by the analysis of just one subband, to minimize computations and permit maximum channel density.

In a preferred embodiment of the invention, the input signals go through subband filters and are downsampled. A Normalized LMS (NLMS) algorithm is then run on the subbanded signals to cancel the echo within the subband. The adaptive filter taps are then analyzed for traces of echo using peak detection methods. Up to three distinct echo reflections can be identified and tracked. In addition, the average tap value is calculated, as is the echo return loss enhancement (ERLE). The average tap value is used to declare double-talk. The ERLE, which estimates how much echo the adaptive filter is cancelling, indicates if a path change has occurred. All of this information is then routed out of the echo locator, to a fullband echo canceller, for example.

The method of the invention only analyzes one subband for minimum computational load and can locates and track multiple echo reflections in the same echo path. It can automatically detect double-talk and report the above information to an external device, such as an echo canceller.

In another aspect the invention provides a device for controlling an echo canceller controller, comprising a subbander for subbanding input signals into a subband; an adaptive filter for processing signals within the subband; a detector for determining echo locations from the filter coefficients in the adaptive filter; and an output for outputting signals representative of said echo locations within said subband.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

In understanding the invention, it will be helpful to define some terms commonly used in echo cancellation technology.

An adaptive Filter is a filter whose coefficients can be adjusted during operation. Adaptive filters are used to estimate unknown parameters, for example an unknown echo path.

Convergence is a condition achieved when an LMS filter has accurately modelled the echo path and is no longer undergoing significant changes. At convergence, the LMS filter is cancelling the maximum amount of echo.

Divergence is a process by which the LMS filter coefficients move away from the actual echo path to erroneous and unpredictable solutions. During divergence, the amount of echo being cancelled becomes less and less.

Double-Talk is a condition which occurs during simultaneous transmission of signals from both sides of the echo canceller.

Echo Path is a mathematical description of the process which imparts an echo to a signal.

ERL or Echo Return Loss is the loss a signal experiences as it travels along the echo path from $R_{OUT}$ to $S_{IN}$.

ERLE or Echo Return Loss Enhancement is a common method of measuring the performance of an echo canceller. This measurement represents the amount that an echo signal has been reduced from $S_{IN}$ to $S_{OUT}$.

Hybrid is a 2-to-4 wire multiplexing device commonly used in telephone circuits. Impedance mismatches in hybrids are a common source of echoes.

LMS Algorithm or Least Mean Squares algorithm is a common adaptive filtering technique.

NLMS Algorithm or Normalized Least Mean Squares algorithm is a variation on standard LMS in which the tap-weight update term is scaled by the inverse of the input signal power.

Subbanding is a process of bandpass filtering and then downsampling a signal.

Figure 1:
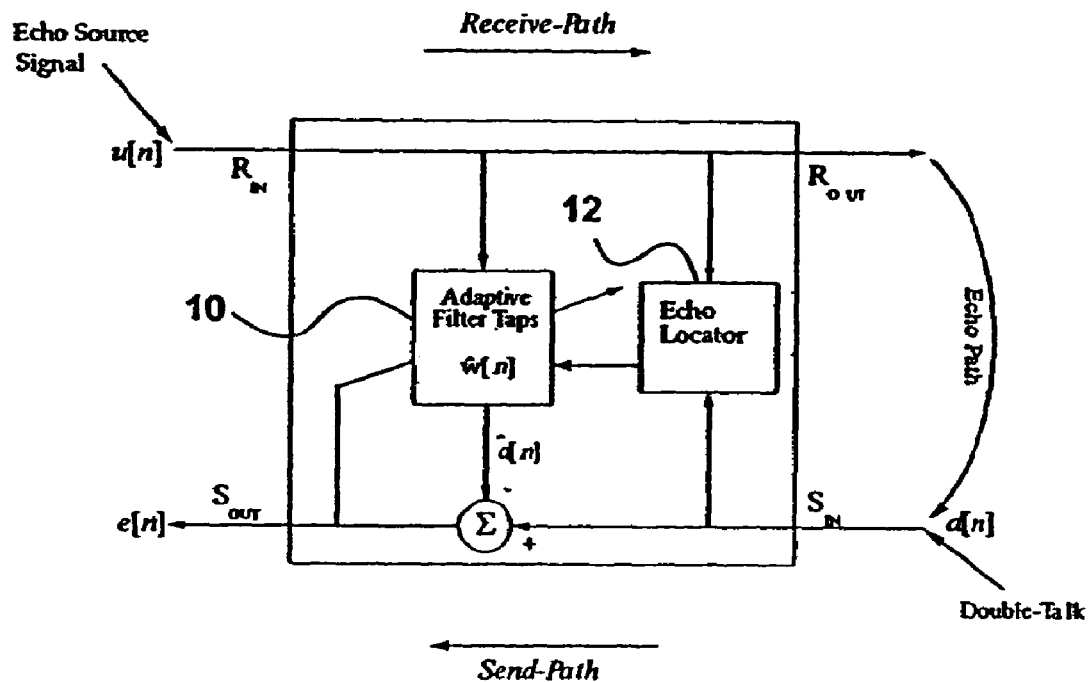
FIG. 1 is a block diagram of an echo cancellation circuiting using LMS adaptive filtering.

The present invention pertains to the use of an integrated echo locating, doubletalk and path change detecting unit as a means of controlling an echo cancelling adaptive filter. Such a system is illustrated in FIG. 1 and comprises an adaptive filter 10 and echo locator 12. Those familiar in the art will recognize the standard echo cancellation topology, but with the addition of the Echo Locator block.

Figure 2:
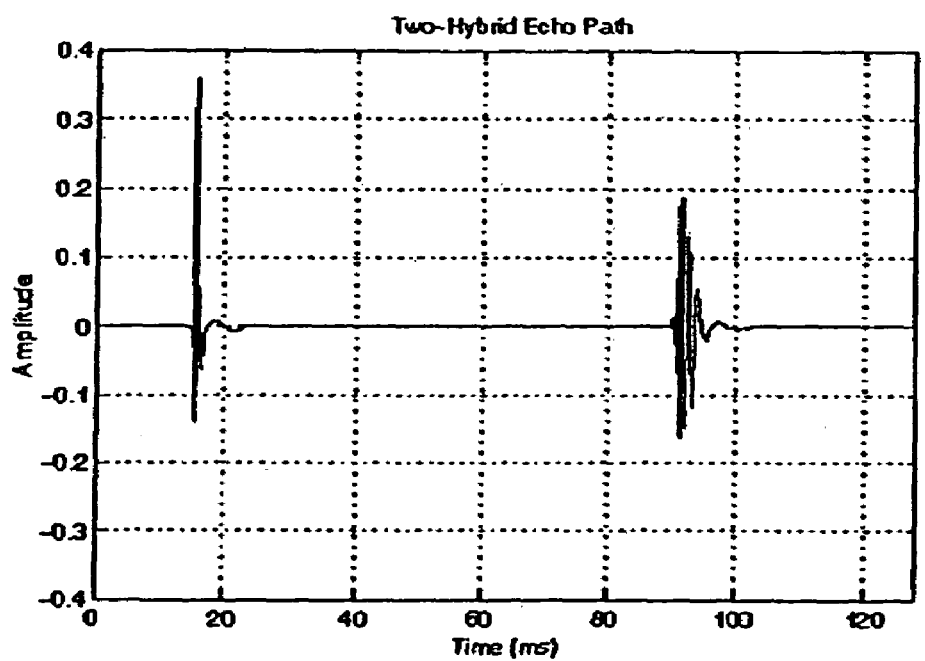
FIG. 2 is a diagram showing a two-hybrid echo path.

In a telephone system, the echo path will be mostly zeroes, but with short echo reflections at various locations. These reflections are most often caused by impedance mismatches in 2-to-4 wire hybrids which occur at various places along the signal path. One or two reflections is not uncommon, with three in very rare cases. An example of an echo path containing reflections from two hybrids is shown in FIG. 2.

The fact that the echo path is sparse (mostly zeroes, but with short, isolated reflections) means that it is very wasteful to run an adaptive filter over the entire length of the echo. It is not uncommon for 80% to 90% of the taps to be zero, so these taps do not need to be updated. The echo locator 12 reduces unnecessary computations by directing the fullband adaptive filter as to which taps should be updated. The locator 12 runs with much fewer computations than the fullband filter.

Figure 3:
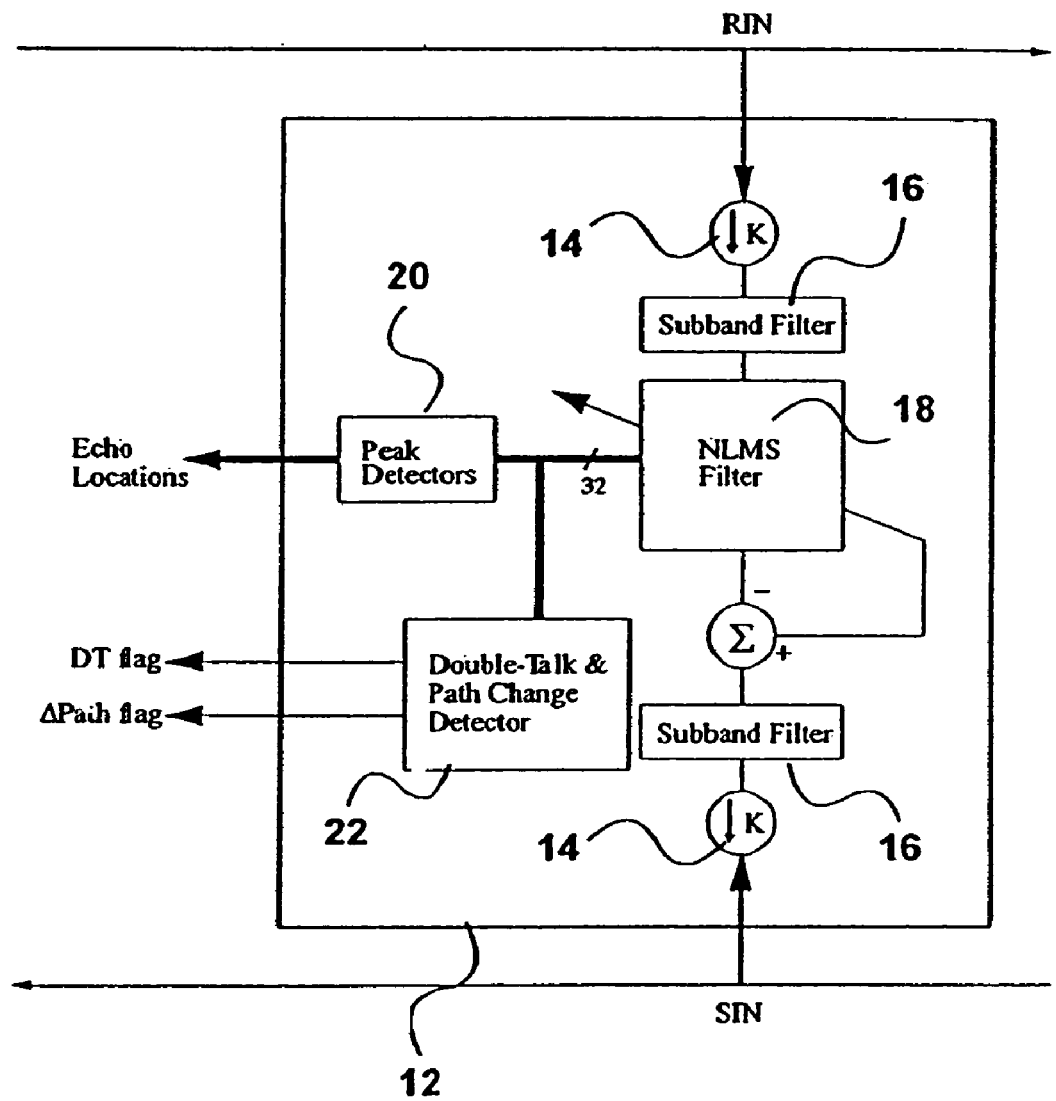
FIG. 3 is a block diagram of an echo locator block in accordance with a preferred embodiment of the present invention.

The preferred embodiment of the present invention is shown in FIG. 3. Signals $R_{IN}$ and $S_{IN}$ enter the echo locator and are downsampled in decimators 14 and then filtered by subband filters 16. In the preferred embodiment, the subband filters are 96-tap single-sided FIR filters. They are implemented using polyphase DFT methods. See, for example, Qu Jin, Zhi-Quan (Tom) Luo, Kon Max Wong, "Optimum Filter Banks for Signal Decomposition and Its Application in Adaptive Echo Cancellation", IEEE Trans. Sig. Proc., Vol. 44, pp. 1669–1679, July 1996, the contents of which are herein incorporated by reference. This allows the downsampling to be done before the filtering, and it requires the fewest computations. The subband filters are designed to pass only positive frequencies between 525 and 725 Hz with approximately −25 dB of aliasing. A downsampling rate of K=32 is used.

The subbanded signal from $R_{IN}$ then enters the subband NLMS adaptive filter 18. To locate echoes with delays of up to 128 ms a fullband adaptive filter would require 1024 taps, so the subband adaptive filter has 32 taps, since 1024/K=32. Subbanding reduces the effective length of the echo by a factor of K in the subbanded domain. This reduction in echo length, paired with the reduction in bitrate from downsampling, provides a tremendous reduction in computations. In this embodiment, the subband NLMS filter uses $32^2$=1024 times fewer computations than a comparable fullband filter.

The subband NLMS filter 18 generates an echo replica, which is then subtracted from the subbanded signal coming from SIN. The resultant error signal is used to update the taps in the NLMS filter 18.

The 32 taps from the NLMS filter enter the peak detector block 20. This block analyzes the absolute values of the filter coefficients to determine where the echo reflections are located. There are a number of ways to do this, but the essence of the process is to locate peaks in the filter profile. Peaks point to regions of the echo path where reflections are located. The peak detector block in the preferred embodiment can locate and track up to three reflections, but it could be modified to find any number of peaks. To assist in the process, the average value of the coefficients is computed.

Any coefficients less than this value are set to zero. This helps to prevent tap noise and aliasing from influencing the peak detection process.

Figure 4:
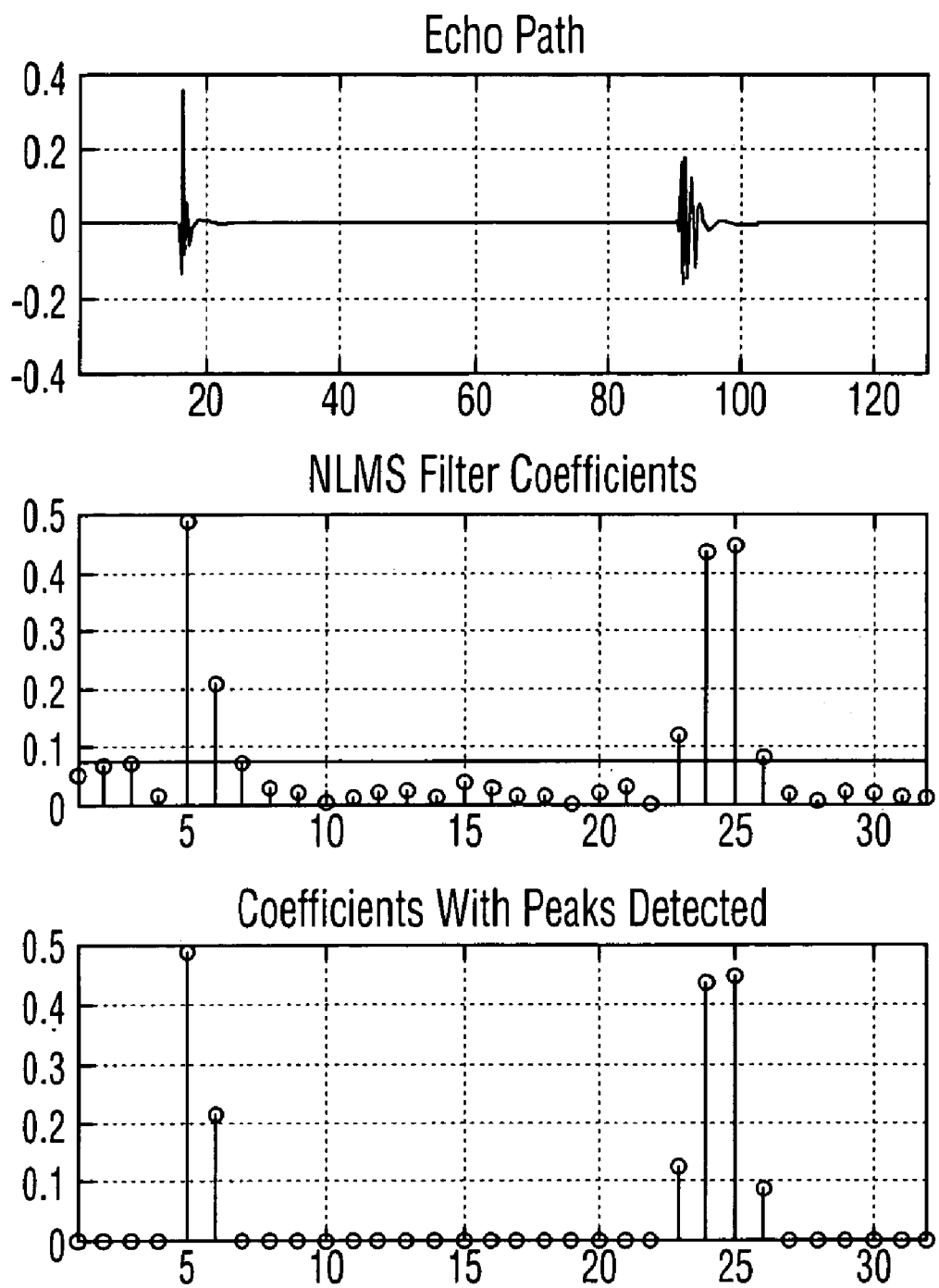
FIG. 4 is a chart showing a series of subbanded NLMS filter coefficient plots.

FIG. 4 illustrates the peak detection process. The top plot shows the echo path from FIG. 2 with two hybrids, one at 15 ms, the other at 90 ms. The middle plot shows the absolute value of the NLMS filter coefficients after converging on the subband version of this echo path. A solid line shows the average tap value. The bottom plot shows the results of peak detection. The two clumps of non-zero coefficients indicate that the hybrids have been successfully located using the subbanded NLMS filter coefficients. Their positions line up with the reflections in the top plot.

Figure 5:
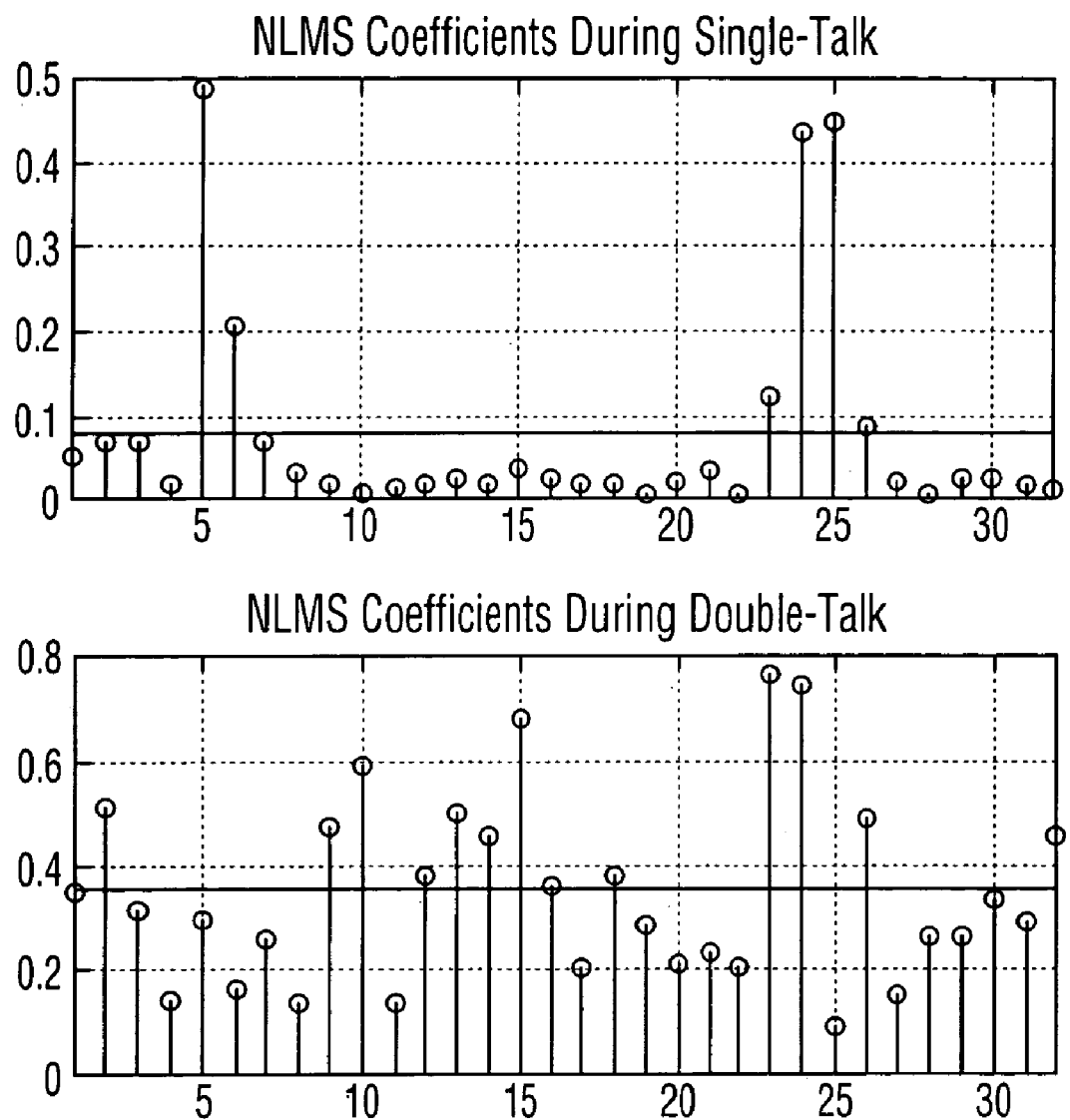
FIG. 5 is a chart showing the effect of double-talk on LNLM filter coefficients.

To detect double-talk, the average NLMS filter coefficient value is used by the double-talk detector 22. This average value has already been calculated by the peak detector, so no further computations are required to obtain it. Due to the sparseness of the echo path, the average tap value is close to zero. Large values in the filter taps correspond to echoes, so there are usually only 2–3 large coefficients. The rest should all be small. The only time this does not occur is with double-talk, as shown in FIG. 5. The top plot shows the NLMS coefficients during single-talk, with their average value drawn as a line through them. The bottom plot shows the coefficients during double-talk. Most of the coefficients are now large, and the average tap value is much higher.

In the preferred embodiment, the ratio between the highest peak and the average tap value is taken. The smaller the ratio, the more double-talk there is. The double-talk flag (the DT line in FIG. 3) is set if this ratio drops below a certain threshold. In FIG. 5, the ratio between the highest peak and the average tap value is about 6:1 for single-talk, but only 2:1 with double-talk. Anything lower than about 3:1 or 4:1 is a good indicator of double-talk.

Path changes are tracked in two ways. If the reflections change location, the peaks in the NLMS coefficients move. This is one path change check which is easy to make. The ΔPath flag is set whenever the peaks move locations.

A more difficult situation to handle is if a reflection does not change location, but does change in type, i.e. the circuit switches to a different hybrid. The peak does not move, but the ERLE decreases dramatically. In fact, the ERLE drops any time the path changes. ERLE is monitored by computing the ratio of $S_{IN}$ to $S_{OUT}$. Large ERLE means good cancellation. When the ERLE drops suddenly, it indicates either a path change or double-talk. If the DT flag is not set when the ERLE drops, the ΔPath flag is set.

Preferred embodiments for each have been given in this invention description, but of course design variations do exist.

M. Vetterli and J. Kovacevic, Wavelets and Subband Coding, Prentice-Hall, Upper Saddle River, N.J. (1995); G. Strang and T. Nguyen, Wavelets and Filter Banks, Addison Wesley, Cambridge, Mass. (1996); and P. P. Vaidyanathan, Multirate Systems and Filter Banks, Prentice Hall, Upper Saddle River, N.J. (1993) illustrate many different subband filter design approaches, any of which could be used. Alternative embodiments could use IIR filters, double-sided filters, cascaded or multi-stage implementations, wavelet decompositions, or any of a number of other methods.

S. Haykin, Adaptive Filter Theory, Prentice-Hall, Upper Saddle River, N.J. (1996) describes several adaptive filter algorithms which could be used here. Besides NLMS, there exist Affine Projection, RLS, and Least Squares methods and their derivatives.

The methods used to detect echo locations, double-talk and path changes exploit properties of the NLMS filtering results. Other techniques are certainly possible. For example, double-talk can also be detected by counting the number of NLMS taps which break the average. As FIG. 5 shows, only six break average with single-talk, but fifteen are above average during double-talk.

The methods indicated in this description are not exhaustive list, but merely those which have been considered or tested. Other methods will be apparent to one skilled in the art without departing from the spirit of the invention as defined in the appended claims.

What is claimed is:

1. A method of effecting echo cancellation in a communications channel, comprising:
   receiving an input signal containing an echo signal;
   developing an estimate signal of said echo signal with a fullband adaptive filter having a plurality of updatable coefficients;
   subbanding said received input signal into a single subband;
   identifying echo locations within said subband with a subband adaptive filter having coefficients; and
   updating a limited set of coefficients in said fullband adaptive filter as determined by said echo locations identified in said single subband by said subband filter; and
   subtracting said estimate signal from an output signal coupled to said input signal; and
   wherein
   said subband adaptive filter generates an echo replica which is subtracted from said output signal to generate an error signal;
   said error signal updates the coefficients of said subband adaptive filter;
   and said echo locations are determined by analyzing the absolute values of said coefficients of said subband filter to identify the peaks in said absolute values.

2. A method as claimed in claim 1, wherein said subband adaptive filter is an NMLS filter.

3. A method as claimed in claim 1, wherein the input signal is subbanded wit a single-sided subband filter.

4. A method as claimed in claim 3, wherein said single-sided subband filter is a FIR filter.

5. An echo canceller, comprising:
   a fullband adaptive filter having updatable coefficients for developing an estimate signal of an echo signal in a received input signal;
   a subbander for subbanding said received input signal into a single subband;
   a subband adaptive filter for processing signals within said subband;
   a detector for identifying echo locations from the coefficients in the subband adaptive filter connected to said fullband adaptive filter, said fullband adaptive filter being configured to update a limited set of the coefficients thereof as determined by the echo locations identified by said detector; and
   a subtractor for subtracting said estimate signal developed by said fullband adaptive filter from an output signal coupled to said input signal; and wherein
   said subband adaptive filter generates an echo replica within said subband;
   a subtractor subtracts said echo replica from an echo signal within said subband to generate an error signal for updating the filter coefficients in said subband adaptive filter; and a peak detector determines the locations of the echoes from the peaks in the absolute values of the coefficients of said subband adaptive filter.

6. An echo canceller as claimed in claim 5, wherein said subband adaptive filter is an NMLS filter.

7. An echo canceller as claimed in claim 5, further comprising a double-talk detector for detecting double-talk from the coefficients of said subband adaptive filter.

8. An echo canceller as claimed in claim 7, wherein said double-talk detector detects double talk by comparing the peak values of the coefficients of said subband adaptive filter with the average values.

9. An echo canceller as claimed in claim 8, wherein said double-talk detector further detects path changes within said subband.

10. An echo canceller as claimed in claim 9, wherein said double-talk detector detects path said changes by detecting changes in echo location.

11. An echo canceller as claimed in claim 10, wherein said double-talk detector detects path changes by detecting changes in ERLE within said subband.

* * * * *